United States Patent
Chen et al.

(10) Patent No.: US 12,511,746 B2
(45) Date of Patent: Dec. 30, 2025

(54) AUXILIARY EVALUATION SYSTEM AND METHOD

(71) Applicant: ASUSTeK COMPUTER INC., Taipei (TW)

(72) Inventors: Yu-Hsin Chen, Taipei (TW); Yu-Jie Shen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 245 days.

(21) Appl. No.: 18/536,469

(22) Filed: Dec. 12, 2023

(65) Prior Publication Data
US 2024/0242345 A1 Jul. 18, 2024

(30) Foreign Application Priority Data
Jan. 12, 2023 (TW) ................................ 112101446

(51) Int. Cl.
| | | |
|---|---|---|
| *G06T 7/00* | (2017.01) | |
| *A61B 1/00* | (2006.01) | |
| *A61B 1/04* | (2006.01) | |
| *A61B 5/107* | (2006.01) | |
| *G06T 7/11* | (2017.01) | |
| *G06T 7/50* | (2017.01) | |
| *G06T 7/62* | (2017.01) | |

(52) U.S. Cl.
CPC ...... *G06T 7/0012* (2013.01); *A61B 1/000096* (2022.02); *A61B 1/04* (2013.01); *A61B 5/1076* (2013.01); *G06T 7/11* (2017.01); *G06T 7/50* (2017.01); *G06T 7/62* (2017.01); *G06T 2207/10068* (2013.01)

(58) Field of Classification Search
CPC . G06T 7/0012; G06T 7/11; G06T 7/50; G06T 7/62; G06T 2207/10068; A61B 1/000096; A61B 1/04; A61B 5/1076
See application file for complete search history.

(56) References Cited

U.S. PATENT DOCUMENTS

2010/0041989 A1* 2/2010 Sehgal ................. A61B 8/0833
601/2
2025/0095829 A1* 3/2025 Usuda ....................... G06T 3/60

FOREIGN PATENT DOCUMENTS

KR 102141541 B1 * 8/2020 ......... A61B 1/00163

* cited by examiner

*Primary Examiner* — Casey L Kretzer
(74) *Attorney, Agent, or Firm* — McClure, Qualey & Rodack, LLP

(57) ABSTRACT

An auxiliary evaluation system and method are provided here. The auxiliary evaluation system is electrically connected to a detection instrument. The detection instrument examines a target and generates a real-time image. The auxiliary evaluation system includes a computing device and a display device. The computing device is signally connected to the detection instrument, and includes a segmentation model, a depth prediction model, and a size prediction model. The computing device receives the real-time image, to mark a selection box for an abnormal feature on the real-time image. The segmentation model generates a bounding box and position information corresponding to the abnormal feature through calculation according to the real-time image and the selection box. The depth prediction model estimates a depth from the abnormal feature. The display device is electrically connected to the computing device to display the real-time image, the bounding box, and the size.

16 Claims, 10 Drawing Sheets

AUXILIARY EVALUATION SYSTEM AND METHOD

CROSS-REFERENCE TO RELATED APPLICATION

This application claims the priority benefit of Taiwan application serial No. 112101446, filed on Jan. 12, 2023. The entirety of the above-mentioned patent application is hereby incorporated by reference here and made a part of the specification.

BACKGROUND OF THE INVENTION

Field of the Invention

The disclosure relates to an auxiliary evaluation system and method for evaluating a size of an abnormal feature.

Description of the Related Art

Endoscopic detection instrument is mainly a technology developed in response to internal examination of the body. It enters the human body through various channels and observes the internal status of the human body to determine whether there is any lesion. Using the most common colonoscopy as an example, it examines colorectal polyps, colorectal cancer, and other lesions through colonoscopy. Generally, a colonoscopy detection instrument includes a specially-made thin flexible tube and a small camera located at the head end of the flexible tube. The flexible tube is placed into the large intestine position through the anus. After the colonoscopy detection instrument is connected to the display, a real-time image of the photographed internal structure of the large intestine is displayed on the display, so that the doctor views or diagnoses the internal health status of the large intestine of the tested person through the real-time image on the display. However, when a polyp is photographed by an endoscope, it is always observed by the doctor's eyes, and the approximate size of the polyp is estimated visually. However, the approximate size data obtained visually is not objective and easy to be controversial.

BRIEF SUMMARY OF THE INVENTION

The disclosure provides an auxiliary evaluation system, adapted to be electrically connected to a detection instrument. The detection instrument examines a target and generates a real-time image. The auxiliary evaluation system includes a computing device and a display device. The computing device is signally connected to the detection instrument, and includes a segmentation model, a depth prediction model, and a size prediction model. The computing device receives the real-time image, to mark a selection box for an abnormal feature on the real-time image. The segmentation model generates a bounding box and position information corresponding to the abnormal feature through calculation according to the real-time image and the selection box. The depth prediction model estimates a depth from the abnormal feature according to the real-time image and the position information. The size prediction model calculates a size of the abnormal feature according to the position information and the depth. The display device is electrically connected to the computing device. The display device is configured to display the real-time image, the bounding box, and the size. The disclosure further provides an auxiliary evaluation method, applicable to a detection instrument to examine a real-time image generated by a target. The auxiliary evaluation method includes: receiving the real-time image, to mark a selection box for an abnormal feature on the real-time image; segmenting a correct position of the abnormal feature according to the real-time image and the selection box to generate a bounding box and position information corresponding to the abnormal feature through calculation; estimating a depth from the abnormal feature according to the real-time image and the position information; calculating a size of the abnormal feature according to the position information and the depth; and finally displaying the real-time image, the bounding box, and the size. Based on the above, in the auxiliary evaluation system and method in the disclosure, after the real-time image is obtained, the size of the abnormal feature on the real-time image is analyzed and evaluated through artificial intelligence (AI). The real-time image is directly displayed on the display device and the size of the abnormal feature is marked on the real-time image, to generate objective size data, so that the doctor clearly knows the size of the abnormal feature to accurately determine the subsequent processing mode in real time. Therefore, the disclosure effectively assists the doctor and provide the doctor with more accurate diagnosis to avoid medical payment disputes. Moreover, because the size of the polyp is related to the risk of recurrence, the size marking of the abnormal feature is used as an important reference for postoperative follow-up.

DETAILED DESCRIPTION OF THE EMBODIMENTS

Figure 1:
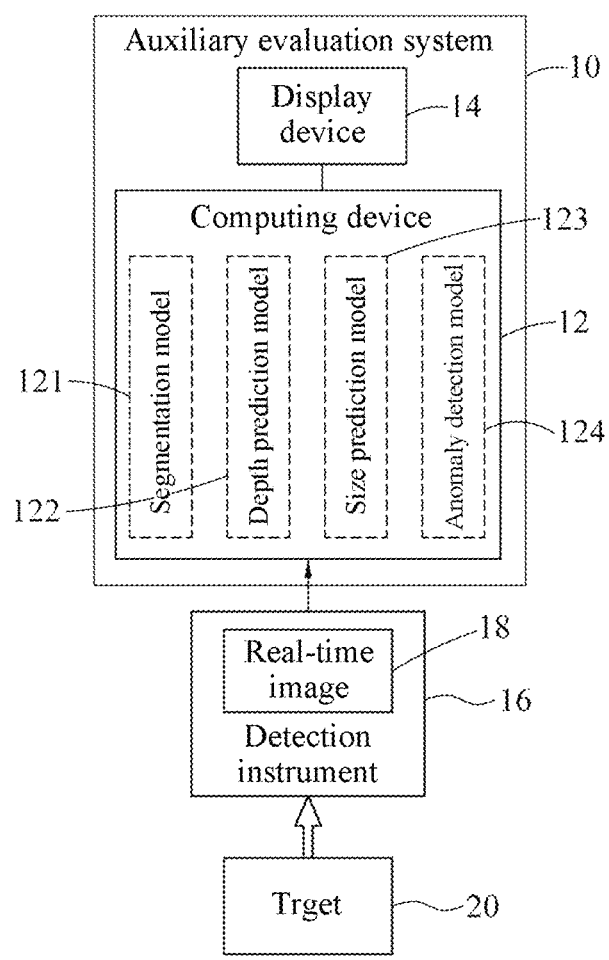
FIG. 1 is a schematic block diagram of an auxiliary evaluation system according to an embodiment of the disclosure.

FIG. 1 is a schematic block diagram of an auxiliary evaluation system and a detection instrument connected to the system according to an embodiment of the disclosure. Referring to FIG. 1, an auxiliary evaluation system 10 is adapted to be electrically connected to a detection instrument 16, and the detection instrument 16 examines and photographs a target 20 and generates a real-time image 18 accordingly. The auxiliary evaluation system 10 includes a computing device 12 and a display device 14. The computing device 12 is signally connected to the detection instrument 16. In an embodiment, the computing device 12 is connected to the detection instrument 16 through a high-definition multimedia interface (HDMI) or a serial digital interface (SDI). The computing device 12 is electrically connected to the display device 14. In an embodiment, the computing device 12 is connected to the display device 14 through an HDMI or an SDI. The computing device 12 includes a segmentation model 121, a depth prediction model 122, and a size prediction model 123. The computing device 12 is configured to calculate the real-time image 18 received from the detection instrument 16. The display device 14 is configured to display the processed real-time image 18 from the computing device 12. In an embodiment, the detection instrument 16 is an endoscopic system, such as a colonoscopy detection instrument. In this case, the target 20 is intestinal tract.

Figure 2:
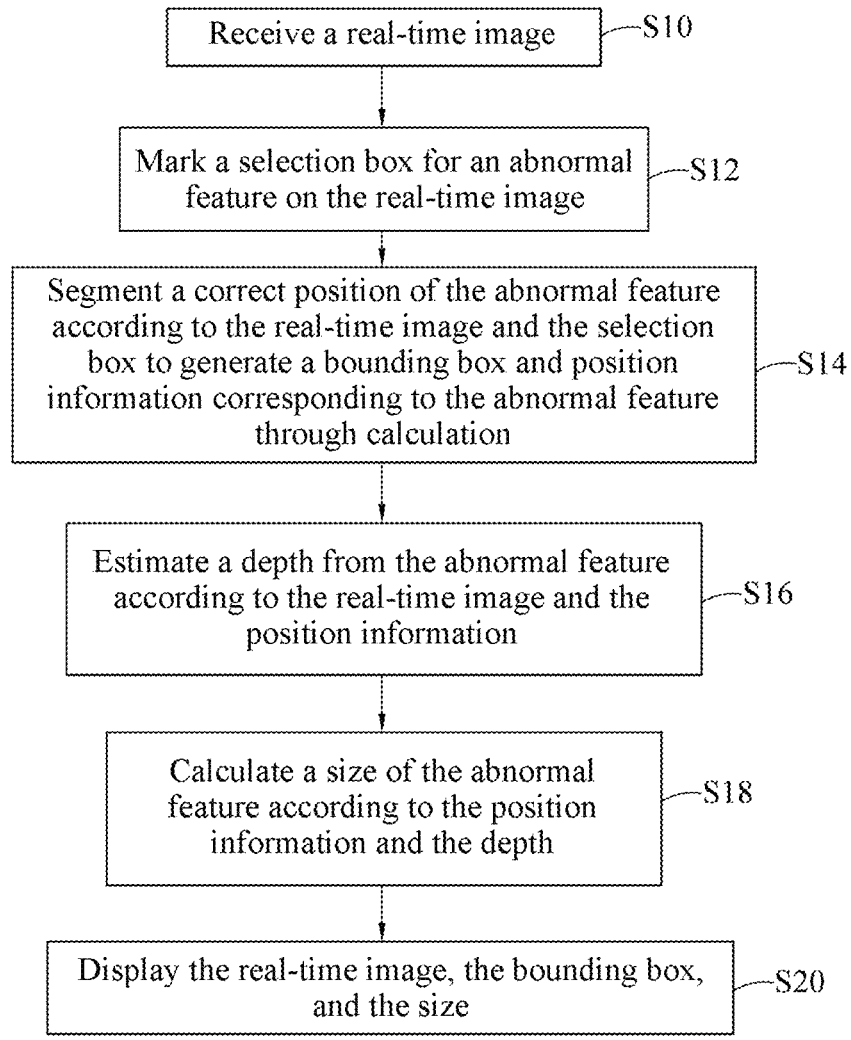
FIG. 2 is a schematic flowchart of an auxiliary evaluation method according to an embodiment of the disclosure.
Figure 3:
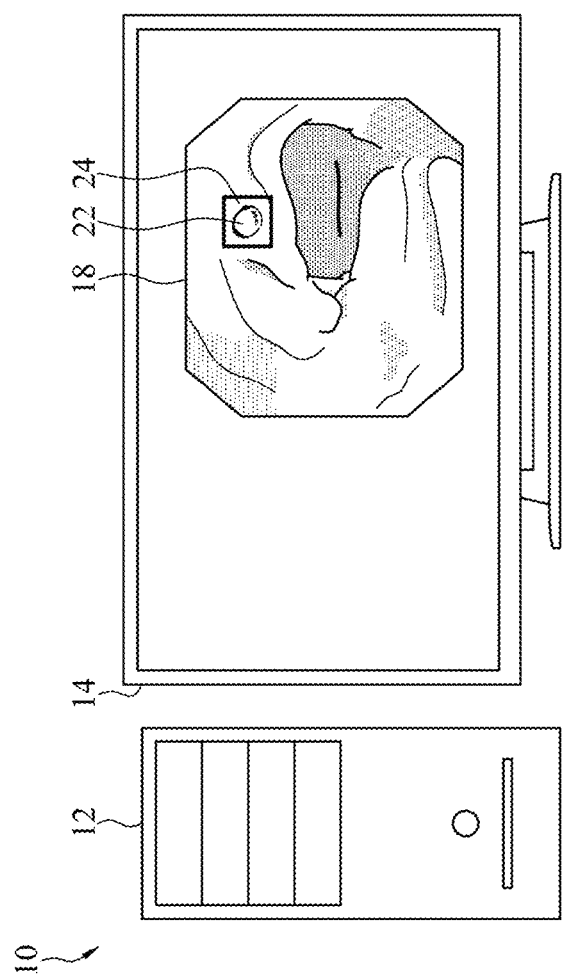
FIG. 3 is a schematic architectural diagram of an auxiliary evaluation system and a real-time image marked with a selection box and displayed by the system according to an embodiment of the disclosure.

The architecture shown in FIG. 1 is still used to describe step processes of performing an auxiliary evaluation method by the auxiliary evaluation system 10 in the disclosure. Referring to FIG. 1 and FIG. 2 together, after the detection instrument 16 examines the target 20 and generates the real-time image 18, first, as shown in step S10, the computing device 12 receives the real-time image 18 from the detection instrument 16, and the real-time image 18 is displayed on the display device 14. As shown in step S12, when an abnormal feature 22 appears on the real-time image 18, a selection box 24 is automatically or manually marked for a position of the abnormal feature 22 on the real-time image 18, as shown in FIG. 3. In an embodiment, the computing device 12 further includes an anomaly detection model 124, to detect the abnormal feature 22 through the anomaly detection model 124, and mark a selection box 24 around the abnormal feature 22. In another embodiment, a doctor manually marks the selection box 24 around the abnormal feature 22 through the computing device 12 to circle the abnormal feature 22.

Figure 4:
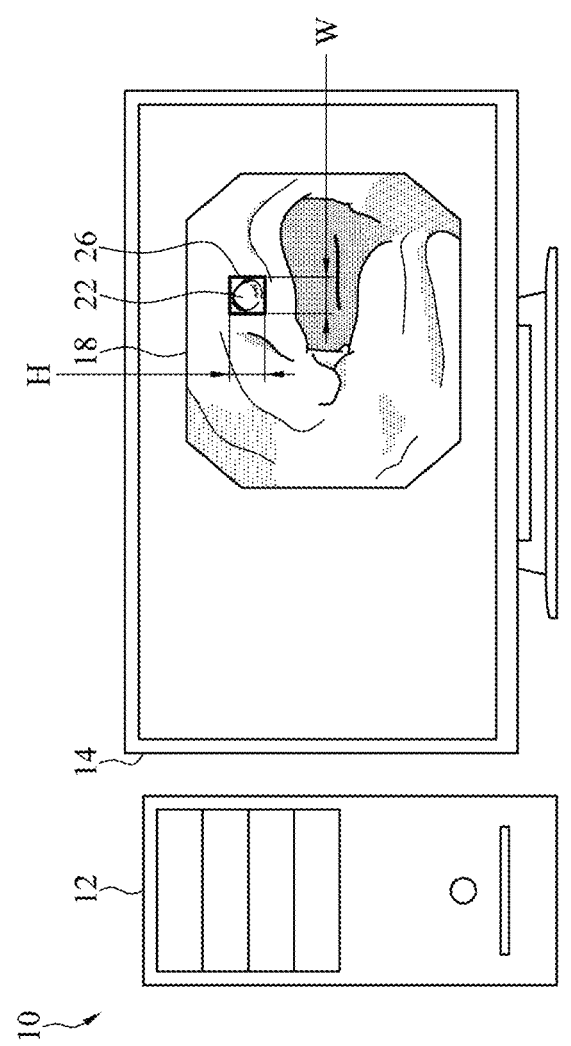
FIG. 4 is a schematic architectural diagram of an auxiliary evaluation system and a real-time image marked with a bounding box and displayed by the system according to an embodiment of the disclosure.

Referring to FIG. 1 and FIG. 2 together, as shown in step S14, the segmentation model 121 in the computing device 12 performs computation according to the real-time image 18 and the selection box 24 to segment a correct position of the abnormal feature 22, to generate a bounding box 26 and position information corresponding to the abnormal feature 22 through calculation. As shown in FIG. 4, the bounding box 26 fits an edge of the abnormal feature 22 to make the position of the abnormal feature 22 more clear, to facilitate subsequent size calculation. As shown in step S16, the depth prediction model 122 in the computing device 12 estimates a depth from the abnormal feature 22 according to the real-time image 18 and the position information. The depth is a distance between a lens of the detection instrument 16 and the abnormal feature 22 on the target 20. As shown in step S18, the size prediction model 123 in the computing device 12 calculates a size of the corresponding abnormal feature 22 according to the position information and the depth. Finally, as shown in step S20, the computing device 12 adds the bounding box 26 and the size of the abnormal feature 22 to the real-time image 18 and outputs the real-time image 18 to the display device 14, so that the display device 14 displays the real-time image 18, the bounding box 26, and the size. The size includes a width W and a height H. In this embodiment, the size of the width W and the height H is marked on a periphery of the bounding box 26. In an embodiment, during an endoscopic diagnosis process, when the abnormal feature 22 is found through the anomaly detection model 124 or the abnormal feature 22 is found manually by the doctor, the computing device 12 displays the size (the width W and the height H) of the bounding box 26 on the real-time image 18 through the above processes.

In an embodiment, the abnormal feature 22 includes hyperplastic tissue or diseased tissue of the target 20, that is, polyps, tumors, or other formations generated on the target tissue.

In an embodiment, the computing device 12 is a computer host or another independent computing electronic device to be used together with the display device 14. In another embodiment, in the disclosure, a notebook computer is directly used to replace the functions of the computing device 12 and the display device 14, so that the notebook computer is responsible for operation of both the computing device 12 and the display device 14.

Figure 5A:
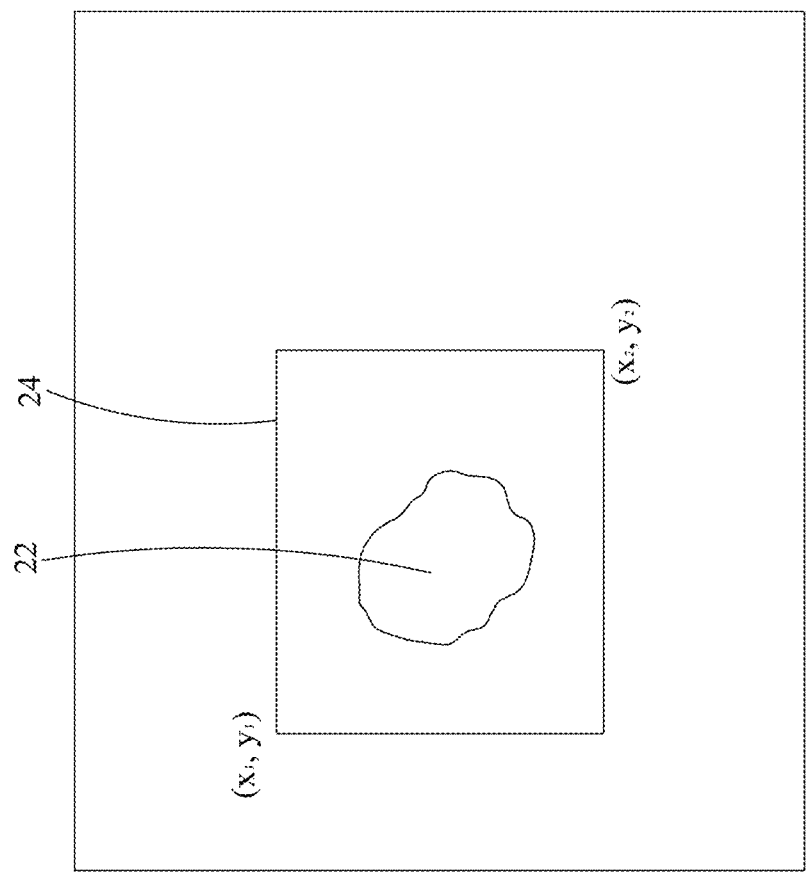
FIG. 5A is a schematic diagram of an abnormal feature marked with a selection box according to an embodiment of the disclosure.
Figure 5B:
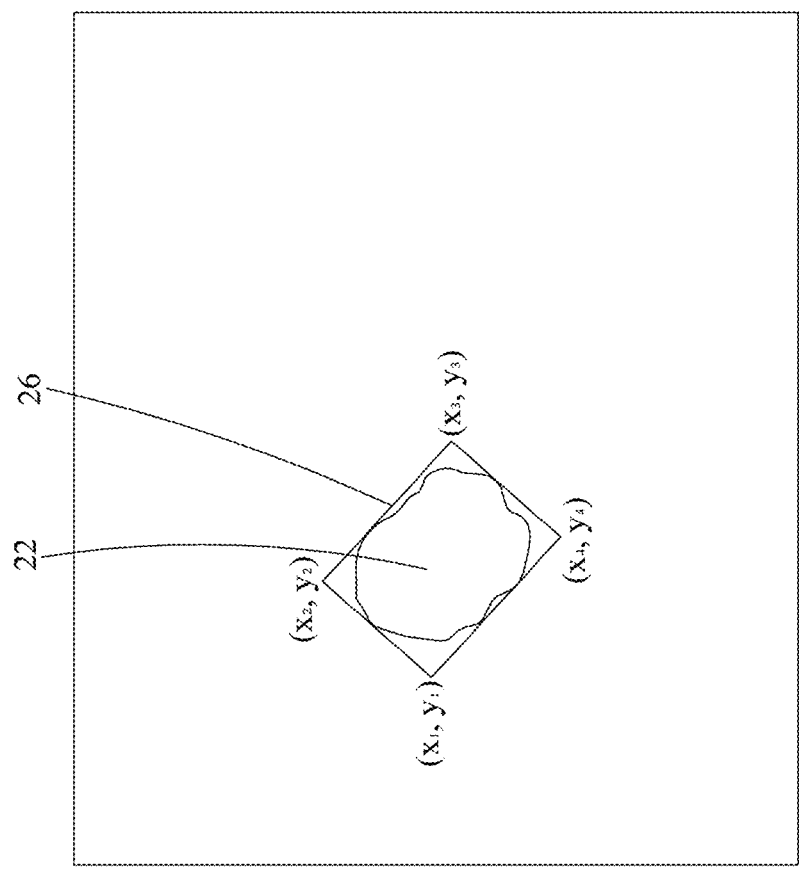
FIG. 5B is a schematic diagram of an abnormal feature marked with a bounding box after processed by a segmentation model according to an embodiment of the disclosure.

In an embodiment, the segmentation model 121 is a neural network model. The segmentation model 121 uses an endoscopic color image as the real-time image 18. After a region on which the abnormal feature 22 is detected is cut, the image is cut into small blocks through a neural network and then local features are calculated. Through analysis of the local features and global features, features of pixels are calculated and results of different sizes are fused to predict a possibility that each pixel in the real-time image 18 is the abnormal feature 22. A contour of the image of the abnormal feature 22 is obtained through threshold calculation, and segmented to obtain the image of the abnormal feature 22. A feature vector of the contour and its oblique variance matrix are calculated by a principal component analysis (PCA) algorithm using contour bumps. A bounding box 26 is obtained after the original contour is transformed. Major and minor axes of the abnormal feature 22 are calculated through corners of the bounding box 26. In a segmentation part of the abnormal feature 22, the difference between the image of the abnormal feature 22 and a background intestinal wall image is distinguished by a hybrid convolution network and a self-attention mechanism. A layered size fusion architecture is adopted to scale and mix abnormal features 22 of different sizes to obtain a more accurate segmentation result, as shown in FIG. 4. Referring to FIG. 5A and FIG. 5B together, the selection box 24 is marked on the periphery of the abnormal feature 22. As shown in FIG. 5A, after the selection box 24 is detected by the segmentation model 121, an exact contour of the abnormal feature 22 is segmented by the segmentation model 121, as shown in FIG. 5B, to mark the bounding box 26. Then, position information of the abnormal feature 22, including $(x_1, y_1)$, $(x_2, y_2)$, $(x_3, y_3)$, and $(x_4, y_4)$, is obtained by calculating the bounding box 26.

Figure 6:
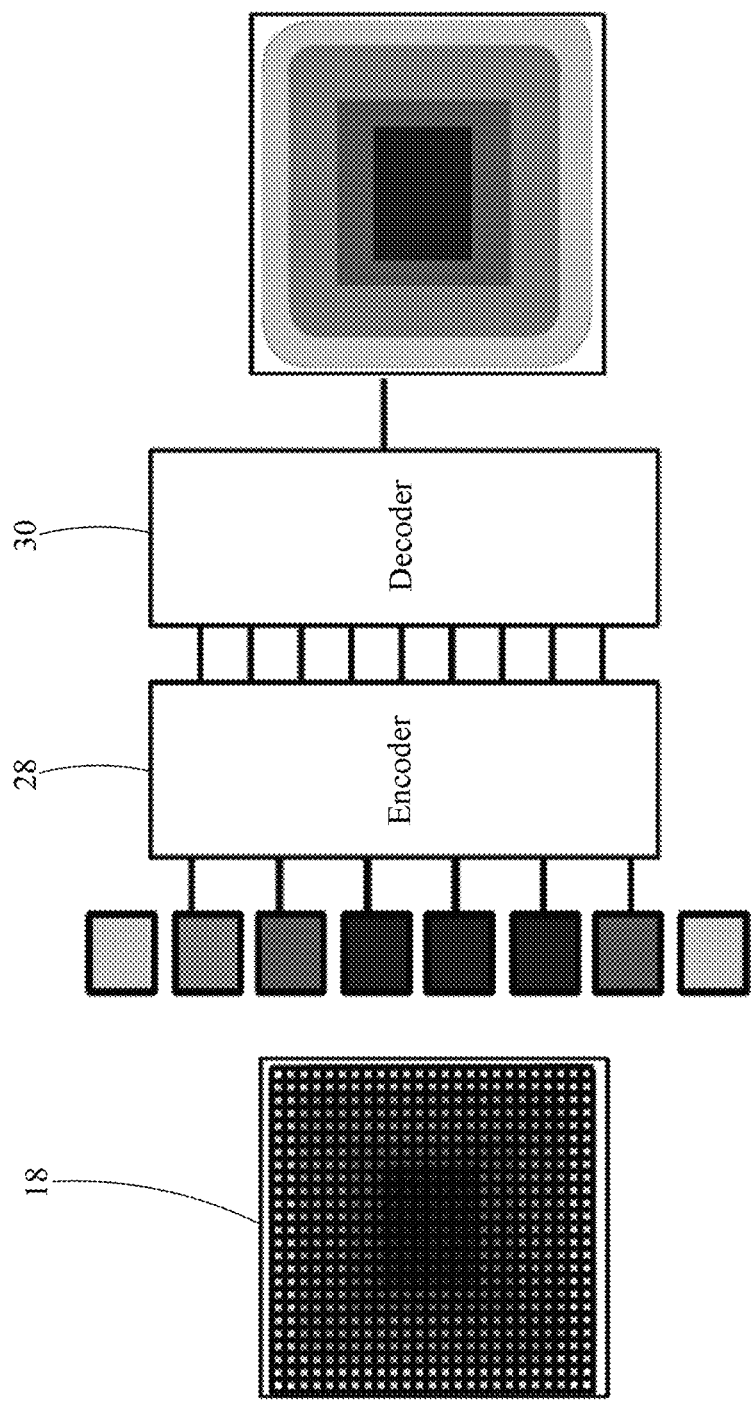
FIG. 6 is a schematic architectural diagram of a depth prediction model used according to the disclosure.

In an embodiment, the depth prediction model 122 is a neural network model. The depth prediction model 122 cuts the real-time image 18 and then inputs the real-time image 18 into the neural network model for depth prediction. A hybrid convolution network and a self-attention mechanism are used to segment the real-time image 18 into blocks and then a relative depth relationship of the block images is obtained through calculation. As shown in FIG. 6, after the real-time image 18 is segmented into a plurality of blocks, associated features between each block are calculated by an encoder 28 of a transformer. Then, a depth image is estimated through scaling by the decoder 30. In the part of monocular depth estimation, using a single image to predict the depth is an ill-posed problem due to its inherent ambiguity. It is quite important to perform depth estimation by calculating a relationship between a global region and local regions. Many feature points in the monocular depth estimation require a global understanding of the scene, such as objects or vanishing points. In addition, local features have similar depth values since adjacent pixels often have a common surface. Therefore, a transformer that effectively utilizes the fusion of distant and near features is used as the encoder 28. In addition, a hierarchically designed decoder 30 enables the local features to generate accurate depth estimation while preserving the structure. In addition, in the depth estimation part of an endoscopic image, since the brightness and the image are different due to the rotation and motion of the lens used by the detection instrument 16, the data enhancement is adopted for this, so that a training data set covers different brightness and different motion rates, to effectively train the depth prediction model 122.

Figure 7:
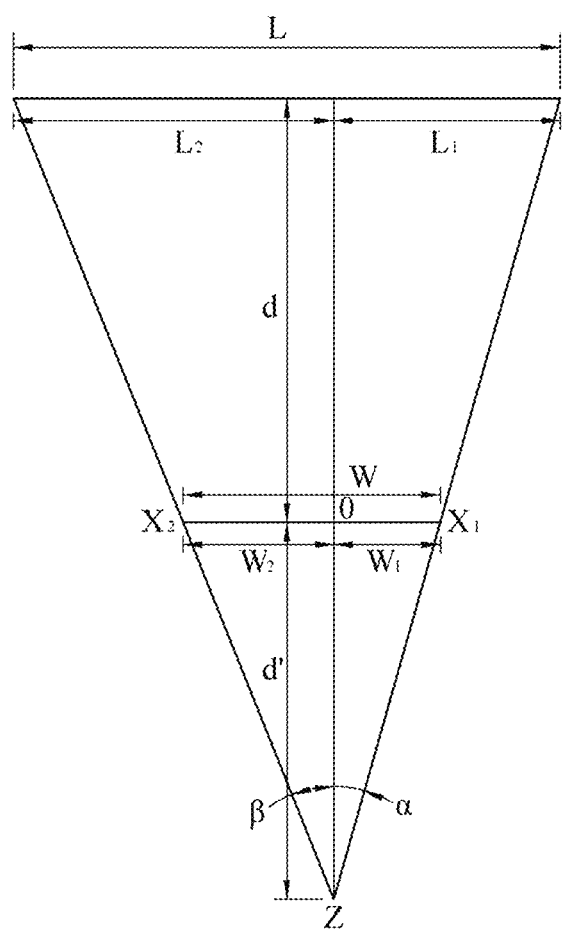
FIG. 7 is a top view of a relationship between an abnormal feature used in a size prediction model used according to the disclosure and a projection plane image.

In an embodiment, the size prediction model 123 is a neural network model, such as: a regression prediction model. Referring to FIG. 7, a relationship between an abnormal feature 22 to be detected and a projection plane image is illustrated in a top view of FIG. 7. As shown in FIG. 7, $$\tan(\alpha) = \frac{w_1}{d'} = \frac{L_1}{d+d'}$$

$$\tan(\beta) = \frac{w_2}{d'} = \frac{L_2}{d+d'}$$

$$\Rightarrow L_1 = \frac{w_1 \cdot d}{d'} + w_1$$

$$L_2 = \frac{w_2 \cdot d}{d'} + w_2$$

$$\Rightarrow L = L_1 + L_2$$

$$= \frac{w_1 \cdot d}{d'} + w_1 + \frac{w_2 \cdot d}{d'} + w_2$$

$$= d \cdot \tan(\alpha) + d \cdot \tan(\beta) + w_1 + w_2$$

$$= d \cdot \frac{x_1 + x_2}{z} + w_1 + w_2$$

$$= D \cdot (x_1 + x_2) \cdot \frac{K_1}{z} + (x_1 + x_2) \cdot K_2$$

It is seen from the above that, $L=F(x_1, x_2, D)$, where L is a length of the abnormal feature 22, D is a simulated depth value from a projection plane to the abnormal feature 22, x is the number of pixels of a width on the projection plane, w is the width on the projection plane, z is a camera virtual focus depth coordinate (constant), $K_1$ is a ratio of a distance to a depth value (constant), $K_2$ is a ratio of a pixel coordinate width to the number of pixels (constant), d is a distance from a target to a photosensitive element of the lens (which changes due to an actual distance from the lens to the abnormal feature), d' is a distance from the photosensitive element to a virtual focus (d' is a fixed value under the condition that lens parameters are unchanged), $\alpha$ is an included angle corresponding to a length $L_1$, and $\beta$ is an included angle corresponding to a length $L_2$. Therefore, it is obtained through a triangular formula that an actual width of the abnormal feature 22 is related to a depth from the projection plane to the abnormal feature 22 and the width on the projection plane.

Figure 8:
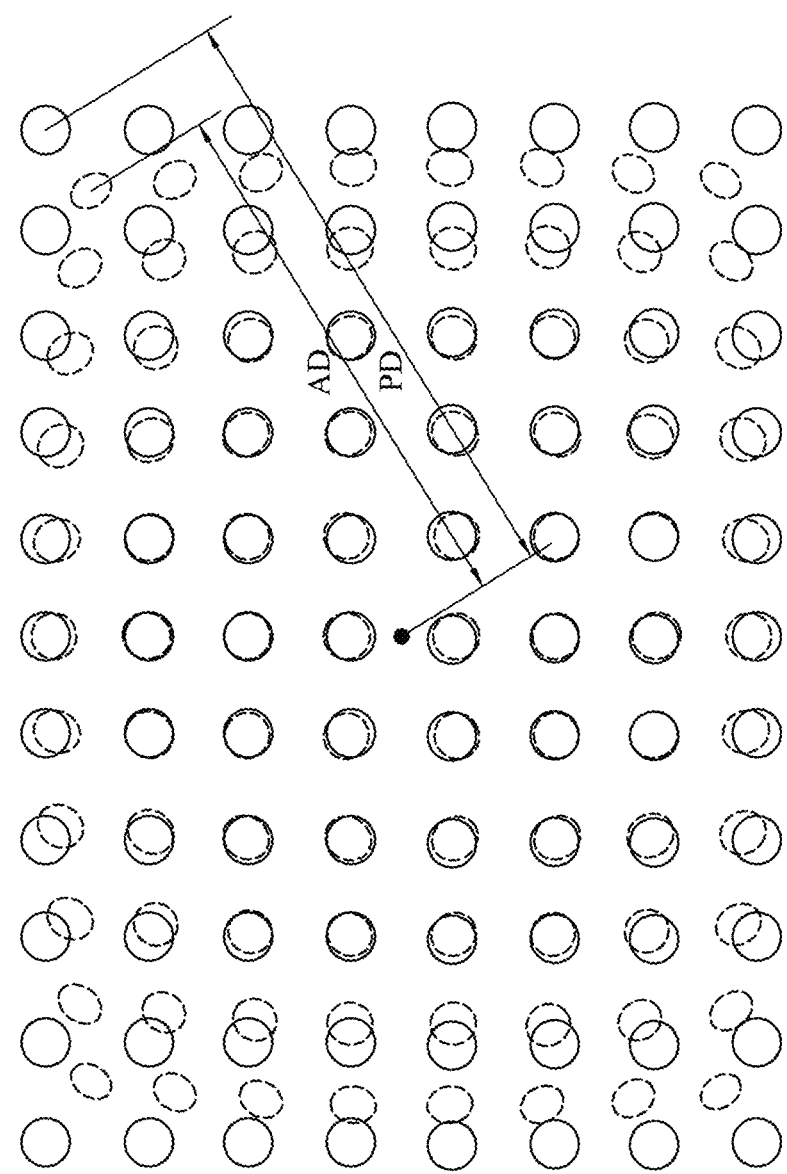
FIG. 8 is a schematic diagram illustrating a comparison between an actual distance with image deformation and a distance without distortion according to an embodiment of the disclosure.
Figure 9:
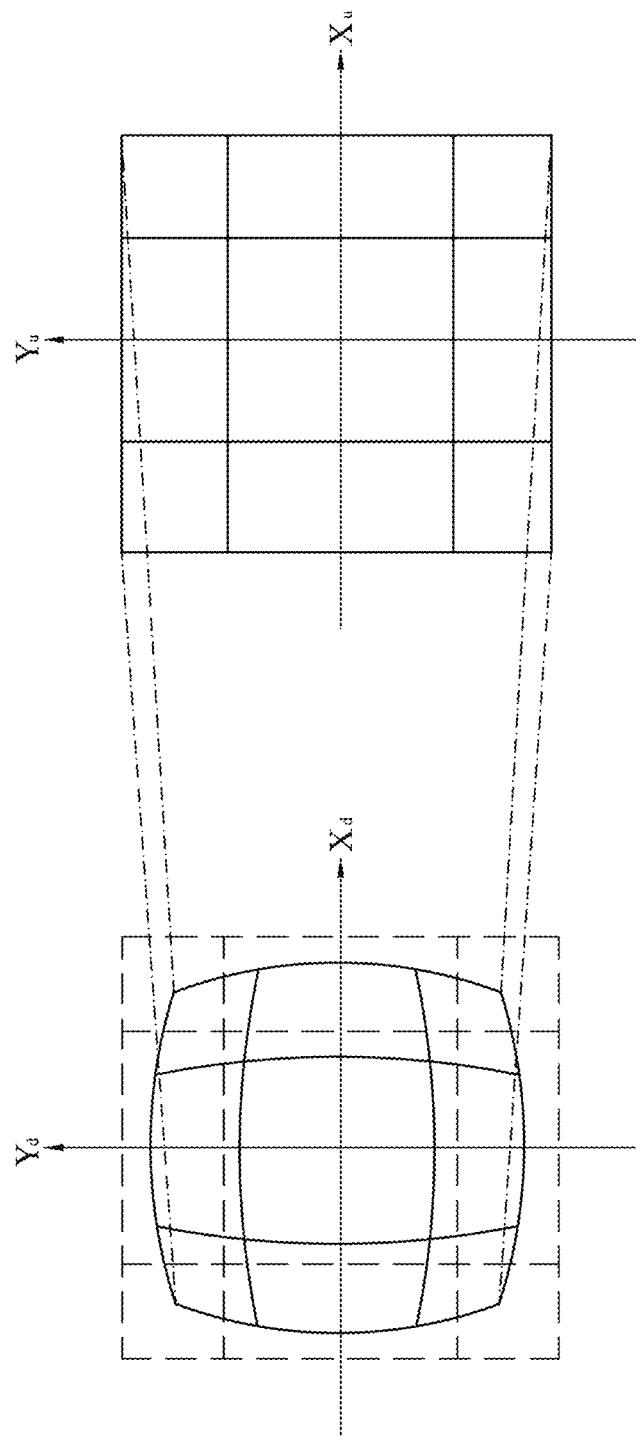
FIG. 9 is a schematic diagram illustrating a correspondence between distorted and undistorted coordinate positions according to an embodiment of the disclosure.

Moreover, since the actual endoscopic image as the real-time image 18 has image deformation, as shown in FIG. 8, a line segment AD is an actual distance, and a line segment PD is a distance without distortion, the impact caused by the deformation needs to be calculated. Referring to FIG. 8 and FIG. 9 together, AD is a distance between the distorted $(X_d, Y_d)$ and a center point, that is, $AD=\sqrt{X_d^2+Y_d^2}$. PD is a distance between the undistorted $(X_u, Y_u)$ and the center point, that is, $PD=\sqrt{X_u^2+Y_u^2}$. $X_u$ is an undistorted X-axis position, $Y_u$ is an undistorted Y-axis position, $X_d$ is a distorted X-axis position, and $Y_d$ is a distorted Y axis position. According to the relational expression of $$\begin{bmatrix} X_u \\ Y_u \end{bmatrix} = \begin{bmatrix} X_d \\ Y_d \end{bmatrix}[1 + \kappa AD^2],$$

where $\kappa$ is a distortion coefficient (constant), it is obtained that $X_u=X_d(1+\kappa AD^2)=X_d[1+\kappa(X_d^2+Y_d^2)]$. Therefore, a distance between two actual horizontal points $(x_{1u}, Y)$ and $(x_{2u}, Y)$ is:

$$L = |x_{2u} - x_{1u}| = |x_{2d}(1 + \kappa(x_{2d}^2 + Y^2)) - x_{1d}(1 + \kappa(x_{1d}^2 + Y^2))| =$$

$$|x_{2d} + \kappa x_{2d}^3 + \kappa x_{2d}Y^2 - x_{1d} - \kappa x_{1d}^3 - \kappa x_{1d}Y^2| =$$

$$|(1 + \kappa Y^2) \cdot (x_{2d} - x_{1d}) + \kappa(x_{2d}^3 - x_{1d}^3)|,$$

and it is obtained that the length L is related to the position information X and Y in the case of image distortion. With reference to the above relationship, it is assumed herein that the length L is $F'(x_1, x_2, Y, D)$. After the segmentation model 121 is processed, referring to FIG. 5B, the bounding box 26 is no longer a horizontal rectangular box. Therefore, the size of the abnormal feature 22 is equivalent to a height of $F_{height}(x_1, y_1, x_4, y_4, D)$ and a width of $F_{width}(x_1, y_1, x_2, y_2, D)$. Therefore, in the disclosure, an approximate solution of $F_{height}(x_1, y_1, x_4, y_4, D)$ and $F_{width}(x_1, y_1, x_2, y_2, D)$ is obtained through AI regression model training, to obtain the size of abnormal feature 22.

Based on the above, in the auxiliary evaluation system and method in the disclosure, after the real-time image is obtained, the size of the abnormal feature on the real-time image is analyzed and evaluated through artificial intelligence (AI). The real-time image is directly displayed on the display device and the size of the abnormal feature is marked on the real-time image, to generate objective size data, so that the doctor clearly knows the size of the abnormal feature to accurately determine the subsequent processing mode in real time. No medical instruments need to be consumed (medical instruments are disposable instruments and is not reusable), and the evaluation process is convenient and fast. The result is displayed in the general diagnosis and treatment process. Therefore, the disclosure effectively assists the doctor and provide the doctor with more accurate diagnosis to avoid medical payment disputes. Moreover, because the size of the polyp is related to the risk of recurrence, the size marking of the abnormal feature is used as an important reference for postoperative follow-up.

The above embodiments are merely to describe the technical ideas and characteristics of the disclosure to enable a person skilled in the art to understand the content of the disclosure and implement it accordingly, and are not used to limit the scope of the claims of the disclosure. That is, any equivalent change or modification made according to the spirit disclosed in the disclosure still falls within the scope of the claims of the disclosure.

What is claimed is:

1. An auxiliary evaluation system, adapted to be electrically connected to a detection instrument, wherein the detection instrument examines a target and generates a real-time image, and the auxiliary evaluation system comprises:
   a computing device, signally connected to the detection instrument, and comprising a segmentation model, a depth prediction model, and a size prediction model, wherein the computing device receives the real-time image, to mark a selection box for an abnormal feature on the real-time image, the segmentation model generates a bounding box and position information corresponding to the abnormal feature through calculation according to the real-time image and the selection box, the depth prediction model estimates a depth from the abnormal feature according to the real-time image and the position information, and the size prediction model calculates a size of the abnormal feature according to the position information and the depth; and
   a display device, electrically connected to the computing device, wherein the display device is configured to display the real-time image, the bounding box, and the size.

2. The auxiliary evaluation system according to claim 1, wherein the computing device detects the abnormal feature through an anomaly detection model and marks the selection box around the abnormal feature.

3. The auxiliary evaluation system according to claim 1, wherein the selection box is manually marked around the abnormal feature through the computing device.

4. The auxiliary evaluation system according to claim 1, wherein the detection instrument is an endoscopic system.

5. The auxiliary evaluation system according to claim 1, wherein each of the segmentation model, the depth prediction model, and the size prediction model is a neural network model.

6. The auxiliary evaluation system according to claim 1, wherein the abnormal feature comprises hyperplastic tissue or diseased tissue of the target.

7. The auxiliary evaluation system according to claim 1, wherein the size is marked on a periphery of the bounding box.

8. An auxiliary evaluation method, applicable to a detection instrument to examine a real-time image generated by a target, and the auxiliary evaluation method comprises:
   receiving the real-time image, to mark a selection box for an abnormal feature on the real-time image;
   segmenting a correct position of the abnormal feature according to the real-time image and the selection box to generate a bounding box and position information corresponding to the abnormal feature through calculation;
   estimating a depth from the abnormal feature according to the real-time image and the position information;
   calculating a size of the abnormal feature according to the position information and the depth; and
   displaying the real-time image, the bounding box, and the size.

9. The auxiliary evaluation method according to claim 8, further comprising detecting the abnormal feature through an anomaly detection model and marking the selection box around the abnormal feature.

10. The auxiliary evaluation method according to claim 8, wherein the selection box is manually marked around the abnormal feature through a computing device.

11. The auxiliary evaluation method according to claim 8, wherein the detection instrument is an endoscopic system.

12. The auxiliary evaluation method according to claim 8, wherein the bounding box and the position information are generated by a segmentation model.

13. The auxiliary evaluation method according to claim 8, wherein the depth is generated by a depth prediction model.

14. The auxiliary evaluation method according to claim 8, wherein the size is generated by a size prediction model.

15. The auxiliary evaluation method according to claim 8, wherein the abnormal feature includes hyperplastic tissue or diseased tissue of the target.

16. The auxiliary evaluation method according to claim 8, wherein the size is marked on a periphery of the bounding box.

* * * * *